Dec. 31, 1940.    L. GOLDHAMMER    2,226,971

MOTION PICTURE CAMERA

Filed Dec. 10, 1938

Inventor
Leo Goldhammer
By His Attorney

Patented Dec. 31, 1940

2,226,971

UNITED STATES PATENT OFFICE 2,226,971

MOTION PICTURE CAMERA

Leo Goldhammer, Munich, Germany, assignor, by mesne assignments, to General Aniline & Film Corporation, New York, N. Y., a corporation of Delaware Application December 10, 1938, Serial No. 245,008 In Germany December 11, 1937

14 Claims. (Cl. 88—17)

My present invention relates to a motion picture camera having film guiding members which are automatically closed.

The motion picture cameras hitherto known which are provided with a roller adapted to feed the film from the supply spool towards the picture window as well as from this window towards the take-up spool, with a film gate which automatically closes itself and pads which automatically press the film against the said roller are disadvantageous since the user must thread the film over the teeth of the said roller by hand, placing each perforation upon its appropriate tooth, must provide the necessary loops of film and must pay attention that the feeding claws engage the perforations of the film correctly.

An object of my invention is to provide means for facilitating the insertion of the film in the guiding and feeding members of the motion picture camera.

Another object of this invention is to provide a motion picture camera having a cover for the camera casing with pressure plates or pins which in closing the cover on the casing, first place the film in correct lateral position and only then release the device for keeping the film gate and the pressure pads in operative closed relation with respect to the film.

A further object of the invention is the provision of a cover for the casing with several spring pressed plates, one big pressure plate thereof being arranged opposite the said film feed roller, one small plate above the picture window and another small plate below the window.

A still further object of the invention is to provide a film feed roller with a single row of teeth which suffices to transport the film satisfactorily. The engaging of the perforations of film by the teeth is moreover facilitated if a merely unilateral row of teeth is arranged.

Other objects and advantages of my present invention are apparent from the following description, the accompanying drawing and the subjoined claims.

A preferred embodiment of my invention is represented in the drawing of which:

Figure 1:
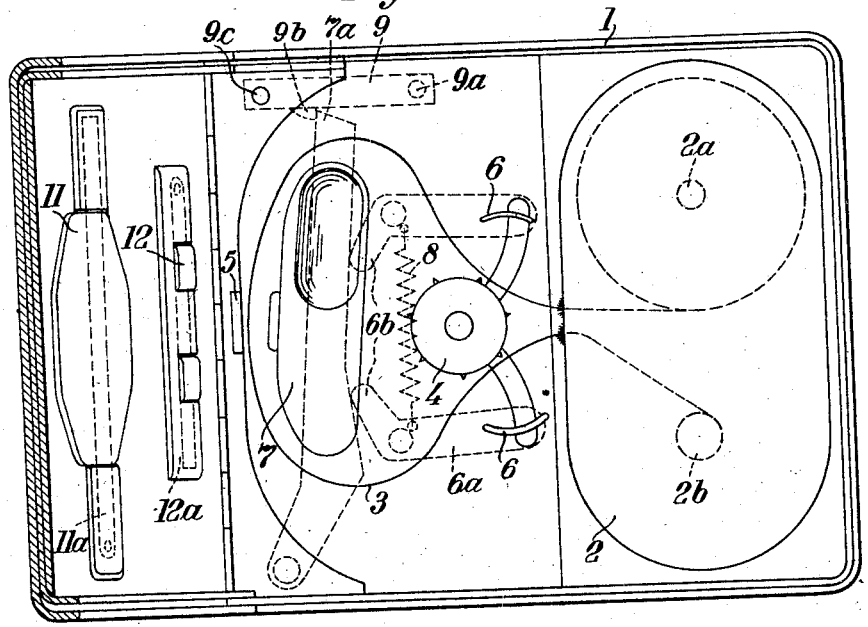
Figure 1 is a side elevational view of the motion picture camera, the cover of the casing being open.

In the motion picture camera 1 there is arranged a magazine 2 which carries the supply spool 2a and the take-up spool 2b. The film 3 passes from the supply spool 2a over the toothed film feeding roller 4 by a loop to the film window 5 and from there by a further loop again over the roller 4 to the take-up spool 2b. The pads 6 which press the film on the roller 4 and the film gate 7 which presses the film on the picture window 5 are kept in the opened position against the action of a spring 8 by a latch 9 of spring material, secured at one end to the casing by pin 9a, and normally sprung outwardly from the adjacent wall of the casing. By pressing inwardly on the pin 9c on the free end of said latch, the nose 9b of the latch 9 releases the lever 7a on which the free ends 6b of the arms 6a of the pads 6 are pressed by the spring 8. In this manner the film gate 7 carried on the lever 7a, and the pressure pads 6 are automatically closed by the tension of the spring 8.

Figure 2:
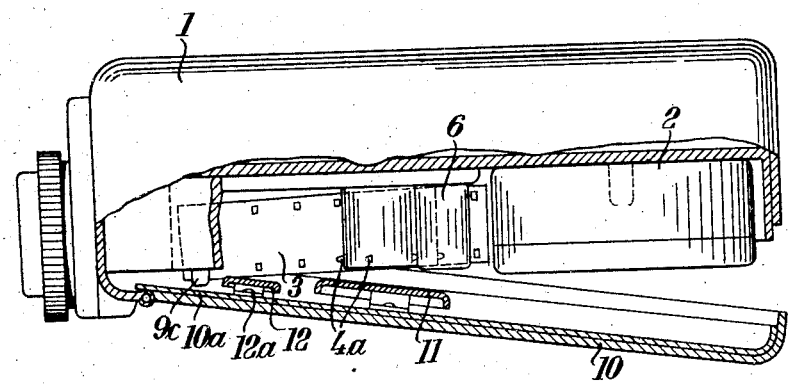
Figure 2 is a top view of the camera showing the cover of the casing opened a little, the top wall being partially broken away.

On the inside of the cover 10 of the casing 1 there are arranged plates 11 and 12, spring pressed and adapted to bring the film, in closing the cover, into the correct lateral position (see Figure 2) before the cover at 10a releases the latch 9 by pressing the release pin 9c and permitting the pressure pads 6 and the film gate 7 to close.

The bigger pressure plate 11, subjected to the action of the spring 11a, is arranged opposite the transporting roller 4, and the two smaller pressure plates 12, subjected to the action of the spring 12a, are positioned opposite the portion of the film band which is above and below the picture window 5. Furthermore, it has been found to be of advantage to provide the row of teeth 4a only on one side of the feeding roller 4.

In accordance with the invention the operator need no longer tediously thread the film over the transporting teeth, but he has merely to place the film, before closing the cover of the casing, between the pressure pads and the feeding roller on the one hand and between the film gate and the picture window on the other hand, providing the usual slack loops. All further manual adjustments are taken over by the device above described.

I claim:

1. In a motion picture camera, a casing being formed with an opening therein, a cover movable to a position wherein it closes said opening, a magazine arranged in said casing and containing a spindle adapted to receive a supply reel and a second spindle adapted to receive a take-up reel, a picture window, a film gate adapted to press the film on said window, a toothed roller adapted to feed the film from said first spindle towards said window as well as from said window towards said second spindle, pads adapted to press the film on said roller, means for keeping said gate and said pads open, means engageable by the cover when the same is moved to closed position for releasing said means, and pressure plates arranged on the inside of said cover and adapted to bring the film into the correct lateral position in closing said cover before said cover releases said means.

2. In a motion picture camera, a casing being formed with an opening therein, a cover movable to a position wherein it closes said opening, a magazine arranged in said casing and containing a spindle adapted to receive a supply reel and a second spindle adapted to receive a take-up reel, a picture window, a film gate adapted to press the film on said window, a toothed roller adapted to feed the film from said first spindle towards said window as well as from said window towards said second spindle, pads adapted to press the film on said roller, means for keeping said gate and said pads open, means engageable by the cover when the same is moved to closed position for releasing said means, and three plates spring pressed and arranged on the inside of said cover and adapted to bring the film into the correct lateral position in closing said cover before said cover releases said means, one of said pressure plates being placed opposite said roller and adapted to control the position of the film above and below said roller, the two other pressure plates being positioned above and below said window and adapted to control the position of the film near said window.

3. In a motion picture camera, a casing being formed with an opening therein, a cover movable to a position wherein it closes said opening, a magazine arranged in said casing and containing a spindle adapted to receive a supply reel and a second spindle adapted to receive a take-up reel, a picture window, a film gate adapted to press the film on said window, a toothed roller adapted to feed the film from said first spindle towards said window as well as from said window towards said second spindle, pads adapted to press the film on said roller, a spring latch adapted to keep said gate and said pads open, means engageable by the cover when the same is moved to closed position for releasing said latch, and three plates spring pressed and arranged on the inside of said cover and adapted to bring the film into the correct lateral position in closing said cover before said cover releases said latch, one of said pressure plates being placed opposite said roller and adapted to control the position of the film above and below said roller, the two other pressure plates being positioned above and below said window and adapted to control the position of the film near said window.

4. In a motion picture camera, a casing being formed with an opening therein, a cover movable to a position wherein it closes said opening, a magazine arranged in said casing and containing a spindle adapted to receive a supply reel and a second spindle adapted to receive a take-up reel, a picture window, a film gate adapted to press the film on said window, a roller carrying a row of teeth on one side and adapted to feed the film from said first spindle towards said window as well as from said window towards said second spindle, pads adapted to press the film on said roller, a spring latch adapted to keep said gate and said pads open, means engageable by the cover when the same is moved to closed position for releasing said latch, and three plates spring pressed and arranged on the inside of said cover and adapted to bring the film into the correct lateral position in closing said cover before said cover releases said latch, one of said pressure plates being placed opposite said roller and adapted to control the position of the film above and below said roller, the two other pressure plates being positioned above and below said window and adapted to control the position of the film near said window.

5. In a motion picture camera having a casing and a cover therefor, a film moving member and a movable film gate, spring means normally urging said gate to closed position, a latch for holding said gate open, and means on said latch engageable by said cover, when the same is moved to casing closing position, for releasing said gate and permitting it to close, said cover also having spring plates thereon, engageable with the edge of the film for positioning and guiding the same with respect to said gate.

6. In a motion picture camera having a casing and a cover therefor, a film moving member and a movable film gate, spring means normally urging said gate to closed position, a latch for holding said gate open, and means on said latch engageable by said cover, when the same is moved to casing closing position, for releasing said gate and permitting it to close, said cover also having spring plates thereon, engageable with the edge of the film for positioning and guiding the same with respect to said gate and said member.

7. In a motion picture camera having a casing and a cover therefor, a film moving member and a movable film gate, spring means normally urging said gate to closed position, a latch for holding said gate open, and means on said latch engageable by said cover, when the same is moved to casing closing position, for releasing said gate and permitting it to close, said cover also having spring plates thereon, engageable with the edge of the film for positioning and guiding the same with respect to said gate, the release of said gate being timed after said plates engage the film.

8. In a motion picture camera having a casing and a cover therefor, a film moving member, spring pressed presser pads normally urged into engagement with the film on said member, a latch in said casing for holding said pads away from said member, and means on said latch engageable by said cover, when the same is moved to casing closing position, for releasing said pads and permitting them to close against the film on said member.

9. In a motion picture camera having a casing and a cover therefor, a film moving member, spring pressed presser pads normally urged into engagement with the film on said member, a latch in said casing for holding said pads away from said member, and means on said latch engageable by said cover, when the same is moved to casing closing position, for releasing said pads and permitting them to close against the film on said member, said cover also having a spring plate thereon, engageable with the edge of the film for positioning and guiding the same with respect to said member.

10. In a motion picture camera having a casing and a cover therefor, a film moving member, spring pressed presser pads normally urged into engagement with the film on said member, a latch in said casing for holding said pads away from said member, and means on said latch engageable by said cover, when the same is moved to casing closing position, for releasing said pads and permitting them to close against the film on said member, said cover also having a spring plate thereon, engageable with the edge of the film for positioning and guiding the same with respect to said member, the release of said spring presser pads being timed after said plate engages the film.

11. In a motion picture camera having a casing and a cover therefor, a film moving member and a movable film gate, presser pads engageable with the film on said member, spring means for normally urging said gate to closed position and said presser pads toward said member, a movable latch for holding said spring means ineffective when said cover is open, and means actuated by the closing of said cover, for releasing said latch and spring film guiding plates on said cover for engaging the edge of the film adjacent said member and gate.

12. In a motion picture camera having a casing and a cover therefor, a film moving member and a movable film gate, presser pads engageable with the film on said member, spring means for normally urging said gate to closed position and said presser pads toward said member, a movable latch for holding said spring means ineffective when said cover is open, and means actuated by the closing of said cover, for releasing said latch and spring film guiding plates on said cover for engaging the edge of the film adjacent said member and gate, the release of said latch being timed after said film guiding plates have engaged the film.

13. In a motion picture camera having a casing and a cover therefor, a film moving member, a pair of pivoted arms carrying presser pads at one end and engageable with the film on said member, a spring connecting said arms and normally urging said pads toward said member, said arms having extended free ends, a lever pivoted in said casing and carrying a film gate, the free ends of said arms engaging said lever and adapted, under the influence of said spring to normally urge said lever to gate closing position, a latch in said casing engageable with said lever for holding said pads and gate in open position against the tension of said spring, and means on said latch engageable with said cover when the latter is moved to closed position, for releasing said latch and permitting said pads and gate to close.

14. In a motion picture camera having a casing and a cover therefor, a film moving member, a pair of pivoted arms carrying presser pads at one end and engageable with the film on said member, a spring connecting said arms and normally urging said pads toward said member, said arms having extended free ends, a lever pivoted in said casing and carrying a film gate, the free ends of said arms engaging said lever and adapted, under the influence of said spring to normally urge said lever to gate closing position, a latch in said casing engageable with said lever for holding said pads and gate in open position against the tension of said spring, and means on said latch engageable with said cover when the latter is moved to closed position, for releasing said latch and permitting said pads and gate to close and film guiding and positioning plates on said cover, engageable with the edge of the film just prior to the release of said latch by the cover.

LEO GOLDHAMMER.